Patented Feb. 22, 1944

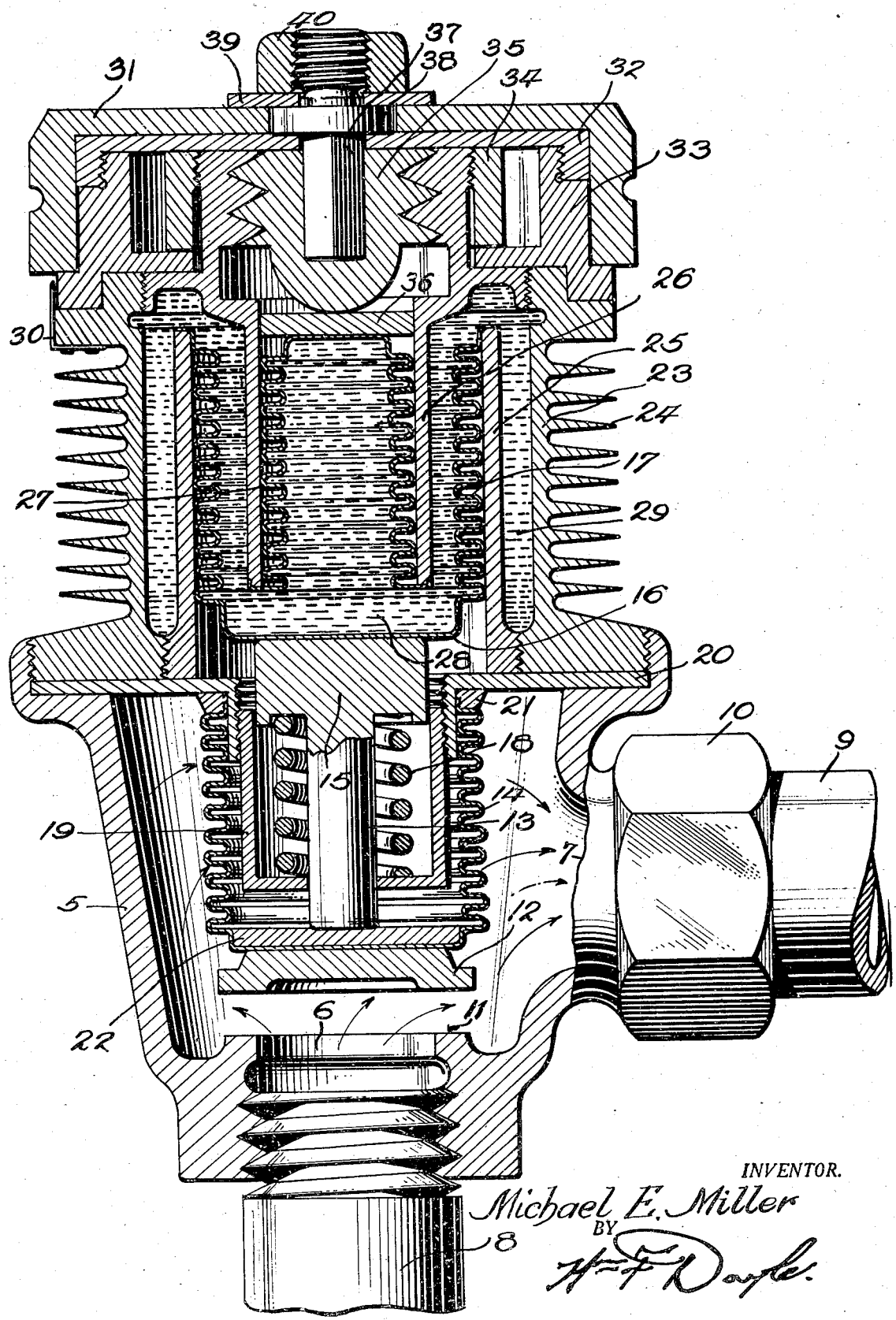

2,342,157

UNITED STATES PATENT OFFICE 2,342,157

THERMOSTATIC RADIATOR VALVE

Michael E. Miller, Omaha, Nebr.

Application October 4, 1941, Serial No. 413,591

1 Claim. (Cl. 236—42)

(Granted under the act of March 3, 1883, as amended April 30, 1928; 370 O. G. 757)

The invention described herein, if patented, may be manufactured and used by or for the Government for Governmental purposes without the payment of any royalty thereon.

This invention relates to radiator valves and more particularly to those types of valves that are capable of automatic and manual operation.

An object of this invention is to provide a thermostatically controlled valve which embodies an upright and an inverted bellows to control the flow of heating medium to the radiator.

Another object of this invention is to provide a thermostatically controlled valve wherein the valve structure provides means for the automatic operation of the valve as well as means for manually controlling the valve independently of the thermostatic operation.

A further object of this invention is to provide a thermostatically controlled valve which is simple, durable, requires a small number of working parts and provides for replacement of the thermostatic element without disconnecting the valve from the radiator.

It is to be understood that the invention is capable of numerous mechanical expressions, one of which, for purposes of illustration, is shown in the accompanying drawing, but it is to be understood that this is for purposes of illustration only and is not to be construed as a limitation of the invention, since slight changes in form and minor details of construction may be resorted to without departing from the spirit of the invention.

In the drawing, the figure represents a longitudinal vertical section through the device embodying the invention.

Reference now being had to the drawing by numerals, in which a valve body or casing 5 is provided with inlet and outlet passages 6 and 7 respectively to which tail pipes 8 and 9 may be connected by a nut 10 in one instance for the purpose of connecting the valve unit in the line. A valve seat 11 is formed in the casing 5 in any suitable manner and a valve 12 is movable toward and away from the seat 11 to control the flow of the heating medium through the valve. Preferably valve 12 is a packless valve and does not require the usual packing required in valves of this type. Said valve is operated toward and away from its seat 11 by a connecting bar 13. Leakage from the valve body is effectively prevented by the seal formed by bellows 14 which is suitably connected to the valve 12 by any well-known means, such as soldering. Thus the valve 12 is constrained against rotation.

The connecting bar 13 is adapted to be actuated to open and close the valve 12 either by hand or automatically by means of suitable thermostatic means responsive to temperature variations, these two operations taking place independently of one another.

The connecting bar 13 extends upwardly and terminates in a head 15 which engages the movable head 16 of the upright bellows 17. Head 15 is resiliently urged into engagement with the movable head 16 by suitable means such as a coil spring 18 bearing at its upper end against the under side of head 15 and at its lower end on an adjusting cage 19 which is threaded into the interior of the tubular support 20, the position of the cage 19 predetermining the tension of the spring 18. The upper end of the bellows 14 is being suitably secured to the support 20 by any well-known means, such as a nut 21.

Said spring 18 controls the action of the connecting bar in response to temperature variation and also maintains the connecting bar in contact with the bellows 14. A packing disc 22 is placed between the connecting bar 13 and the bellows 14 to cushion the downward thrust of the connecting bar 13.

In the form shown a tubular temperature transmission radiator 23 having circular fins 24 thereon is threaded into the interior of the valve body or casing 5 until it contacts the support 20. Said radiator 23 has internally threaded at its lower end a support 25 to which the bellows 17 is suitably connected by any well-known means, such as soldering. The radiator 23 has internally threaded into its upper end a support 26 to which is suitably connected by any well-known means such as soldering an inverted bellows 27. The radiator 23 and the bellows 17 and 27 form a reservoir 28 which contains a fluid 29 therein. The connecting bar 13 is constrained to reciprocate by the expansion of the fluid 29 in the reservoir 28. The pressure on the bellows 17 and the spring 18 forces the movable head 16 downward or upward so that the valve 12 is moved toward or away from the seat 11. Suitable means, such as an indicator 30 secured to the radiator 23 serves to indicate the extent of rotation of a hand wheel 31 with respect to the casing.

The hand wheel 31 has a metal insert 32 which is threaded on to a revolvable member 33 which is retained in place by a circular nut 34 which is threaded on to the upper end of the support 26. The support 26 is internally threaded to receive a manually adjusting screw 35 which bears against a packing disc 36 which rests on the bellows 27. The screw 35 has an adjusting stem 37 reciprocally mounted therein. This stem 37 has a stop 38 integral therewith and is adapted to be secured to the hand wheel 31 by means of a washer 39 and nut 40.

Therefore, by rotating the hand wheel 31, metal insert 32 secured to wheel 31 and threaded on to revolvable member 33 and the stem 37 which is retained in place by compressing the stop 38 between the metal insert 32 and washer 39 by a nut 40, will move as a unit, causing the adjusting screw 35 to move downward and compress the fluid 29 within the reservoir 28, thereby manually moving the valve 12 toward and away from the seat 11.

The device described above may be installed, for example, with the tail pipe 8 connected to a source of supply of a heating medium such as steam and with the tail pipe 9 connected to a radiator or other point to which the said heating medium is to be delivered, the flow of said medium through the valve being automatically controlled by the thermostatic bellows 17 and 27 in accordance with variations in the temperature of the surrounding atmosphere. Preferably, the valve should be installed in such a position that the radiator 23 is subjected at all times to a free circulation of air at normal room temperatures and is not subjected to any unusually high temperature or cold draughts. In order that the thermostat shall be sensitive to temperature variations of the atmosphere care is taken to prevent conduction of heat from the valve casing or pipes to the thermostatic element.

The operation of the device will be understood from the foregoing description, assuming the valve 12 to be closed, when it is desired to open the same the hand wheel 31 is rotated by hand, the valve 12, however, is constrained from rotation with hand wheel 31 as above described by the bellows 14. Rotation of the hand wheel 31 will cause the valve 12 to be moved away from its seat 11 an amount depending on the extent of rotation of the revolvable member 33 relative to the indicator 30 on the radiator 23 and this may be guaged by suitable marking provided on the radiator 23 to register with the indicator 30. When the valve is thus in an open position, changes in vapor pressure in the fluid 29 in the reservoir 28 due to a change in the temperature in the surrounding atmosphere tend to expand the bellows 27 or permit it to contract due to the action of the spring 18, and thus connecting bar 13 moving longitudinally within the support 20 and cage 19 tends to move the valve 12 toward or away from the seat 11. Contraction of the fluid and expansion of the spring will tend to reverse the action described and move the valve 12 in like manner with regard to the seat 11. The pressure that is required to close the valve 12 is determined by the distance it is necessary to compress the spring 18 and this in turn is determined by the distance through which the valve 12 must move in order to reach the seat 11. The distance of the valve from the seat or the amount of travel required can be adjusted by adjusting the cage 19 carrying the connecting bar and spring. The pressure of the spring regulated by adjusting the cage moves the valve away from or closer to the seat. Therefore the vapor pressure or in other words the atmospheric temperature at which the valve will be closed may be controlled by the extent of the manual opening of the valve and the revovable member 33 may be graduated to indicate the temperature which will be maintained. As stated, the valve may be closed manually by rotating the hand wheel 31 in the proper direction. Fine adjustment may be made at the factory by relative rotation between the cage 19 and support 20, the support 20 remaining stationary at all times.

There is thus provided a thermostatically operated valve actuated by means of communicating upright and inverted bellows arranged one within the other so that both bellows can be completely filled with an expansive liquid which can be compressed by exerting pressure on the inverted bellows and in this way cause the upright bellows to travel in a downward or upward direction, thus providing a valve which can be opened or closed manually, independently of the thermostatic operation thereof but which when left open will be automatically controlled by the thermostatic bellows to regulate the flow of a heating or cooling medium so as to maintain a desired temperature automatically. Moreover, the temperature which is to be maintained may be regulated by the extent of opening of the valve by hand. The entire construction is self-contained and is adapted to be installed as a unit, requires no adjustments other than the initial adjustment of the device made at the factory and is very easily operated. The construction is simple and desirable and has few parts, so that it is economical to manufacture while it is efficient and reliable in operation, and there is nothing that is apt to get out of order and require servicing except the thermostatic bellows, which can be easily removed and replaced without disconnecting the valve. Leakage from the valve is effectively prevented by the seal afforded by the bellows 14 connected to the valve 12. The heat transmitted through contact of the parts with the thermostatic bellows can be furher insulated by use of insulating material or by insulating the contacts.

While only one embodiment of the invention has been described and illustrated in the drawing, it will be apparent that the invention is capable of a wide variety of mechanical expressions and that changes may be made in the form, details of construction and arrangement of parts without departing from the spirit of the invention as expressed by the scope of the appended claim.

Having thus described the invention, what is claimed as new and desired to secure by Letters Patent is:

In a valve of the class described, a valve casing, a hollow radiator mounted directly thereon, an inverted bellows and an upright bellows within said radiator, each having an open end secured to said radiator, said bellows being disposed one within the other and in mutual communication, temperature responsive fluid within said bellows, said inverted bellows having a top positioned to exert pressure on said fluid, a valve stem engaged with the bottom of said upright bellows and disposed in said valve casing, said radiator being formed with an annular reservoir surrounding the outer bellows and in fluid communication therewith, and an adjustable pressure-exerting member engaging the top of said inverted bellows.

MICHAEL E. MILLER.